Patented Nov. 25, 1941

2,264,171

UNITED STATES PATENT OFFICE 2,264,171

AIR CONDITIONING SYSTEM

Harold L. Steinfeld, East Orange, N. J., assignor to Minneapolis-Honeywell Regulator Company, Minneapolis, Minn., a corporation of Delaware Application June 29, 1939, Serial No. 281,857

21 Claims. (Cl. 62—6)

This invention relates in general to air conditioning and more particularly to automatically controlled systems of this type.

It is an object of this invention to provide an air conditioning control system which automatically maintains proper temperature and humidity conditions within a conditioned space.

A further object of this invention is the provision of an air conditioning system in which the action of a heat exchange means over which air is passed is varied by controlling the flow of cooling medium or the flow of air through the heat exchange means, and in which the temperature of the active portion of the heat exchange means is varied in accordance with such flow.

Another object of this invention is the provision of a system utilizing a variable capacity compressing means in which the compressing means is controlled by means influenced by the condition of the heat exchange means, and in which the compressor controlling means is adjusted upon change in flow of refrigerant.

A further object of this invention is the provision of a system of the type mentioned, in which the compressor controlling means is additionally controlled in accordance with humidity.

Another object of this invention is the provision of a system utilizing a single or a plurality of compressors which are automatically controlled, with a sequence timing arrangement for preventing simultaneous starting or changing in operation of such devices.

Other objects will appear from the following description and the appended claims.

Figure 1:
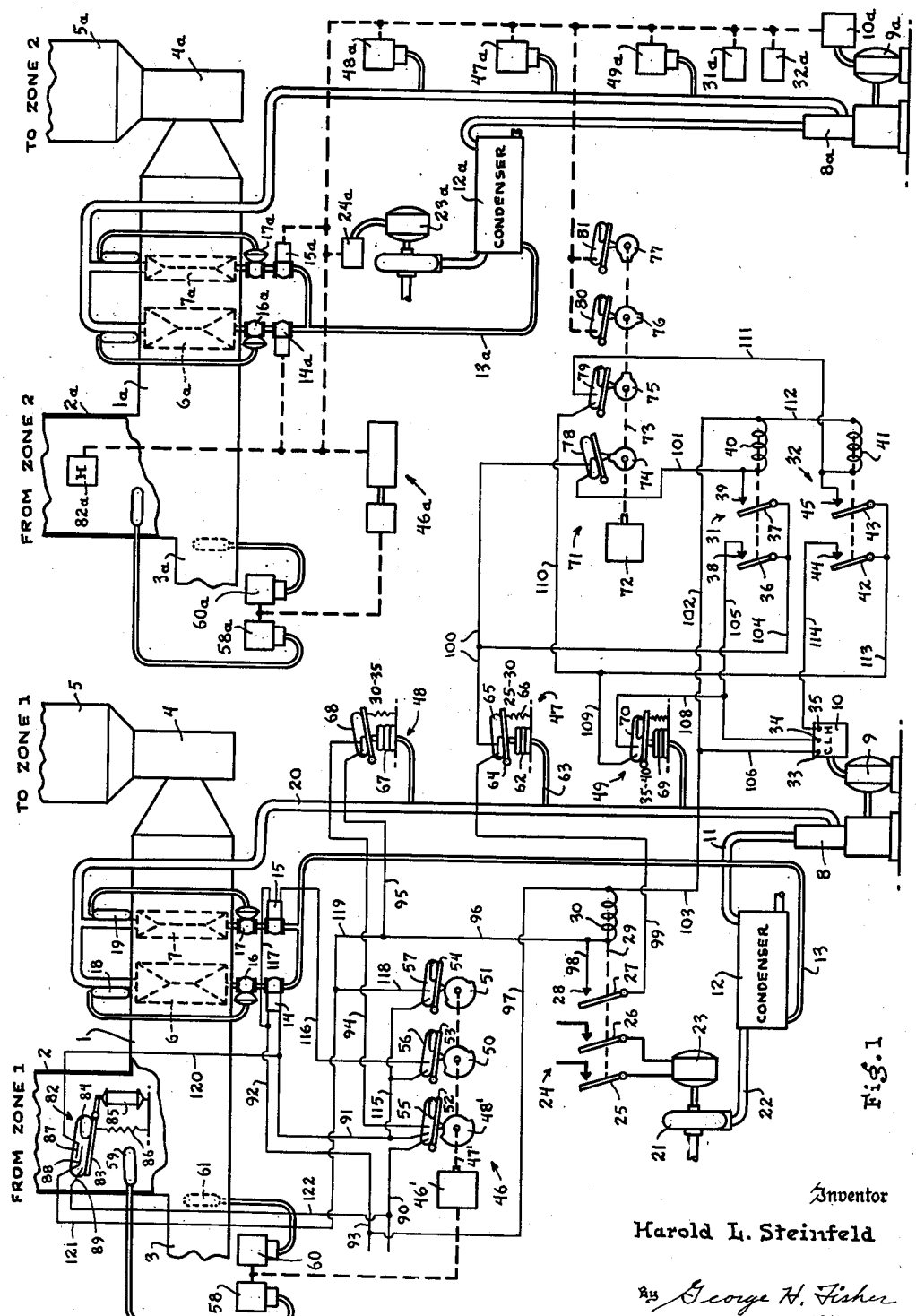
Figure 2:
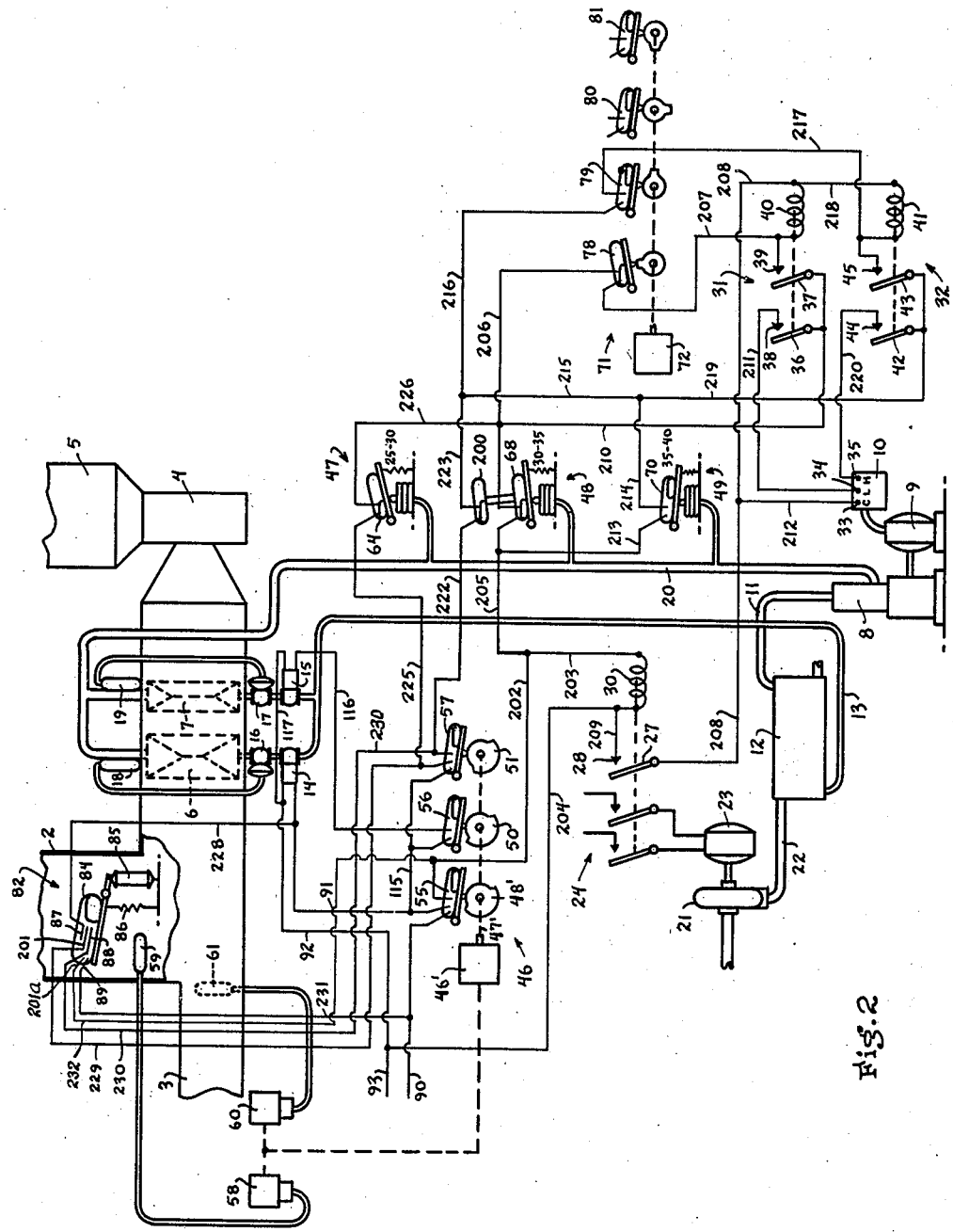

For a full disclosure of this invention reference is made to the following detailed description and to the accompanying drawings in which:

Figure 1 shows diagrammatically an air conditioning system comprising a plurality of units which are controlled in accordance with this invention, and in which Figure 2 shows diagrammatically a modified form of the invention.

Referring to Figure 1 reference character 1 indicates an air conditioning chamber for conditioning the air in a first zone. This chamber is provided with a return air inlet duct 2 which leads from the first zone and with a fresh air inlet duct 3 for providing a supply of fresh air. This chamber also is connected to a fan 4 which discharges air drawn through the chamber 1 into a discharge duct 5 which conducts the conditioned air to the zone being conditioned. Located within the chamber 1 is a first cooling coil 6 and a second cooling coil 7. These cooling coils form a part of a refrigeration system including a compressor 8 which is driven by means of a two speed motor 9 having a two speed starting or control box 10. The compressor 8 is connected by a discharge line 11 to a condenser-receiver 12 which is in turn connected to a liquid line 13 which leads to the inlets of solenoid valves 14 and 15. The outlets of the solenoid valves are connected respectively to expansion valves 16 and 17 located at the inlets of cooling coils 6 and 7, respectively. These expansion valves are preferably of the thermostatic type including thermostatic bulbs 18 and 19 on the discharge lines from the cooling coils 6 and 7. These discharge lines join into a common suction line 20 leading to the inlet of compressor 8. The operation of refrigeration systems of this type is well understood in the art.

The condenser 12 is provided with a cooling water pump 21 which is connected thereto by a pipe 22, this pump being driven by means of an electric motor 23. This motor 23 is provided with a starter 24 of usual construction. The multi-speed motor shown is of a type employing a starting box, however the invention does not reside in the particular multi-speed motor selected. A motor of the type shown in the patent to Fillo No. 1,941,546, with the three leads 33, 34 and 35 connected direct to the motor may be employed. This motor starter 24 includes a pair of switch arms 25 and 26 which are interposed in the line wires leading to motor 23. This device also includes an auxiliary switch arm 27 which cooperates with a contact 28. These switch arms are operated by a suitable armature 29 cooperating with a pull in coil 30. When this coil is energized the switch arms are caused to engage their respective contacts thereby operating the motor 23 and completing a circuit through switch arm 27 and contact 28 which will be described as this description proceeds. However, when coil 30 is deenergized, the switch arms will disengage their respective contacts for placing the pump 21 out of operation.

The two-speed starting box 10 for the compressor motor 9 is controlled by a pair of relays 31 and 32. The starting box 10 is provided with a common terminal 33, a low speed terminal 34, and a high speed terminal 35. When terminals 33 and 34 only are connected across a source of power, the compressor motor 9 will operate at low speed. However when the common terminal 33 and the high speed terminal 35 are connected across the source of power, the compressor motor 9 will operate at high speed even though terminals 33 and 34 are connected across the power source simultaneously. The relay 31 is provided for connecting the source of power across the common terminal 33 and the low speed terminal 34 and thus may be termed a low speed relay. This relay may be of usual form having switch arms 36 and 37 cooperating with contacts 38 and 39, these switch arms being actuated through a usual armature by means of a pull in coil 40. When coil 40 is energized, the switch arms 36 and 37 will engage their respective contacts while when this coil is deenergized the switch arms will disengage the contacts. The relay 32 is provided for the purpose of connecting the source of power across the common terminal 33 and the high speed terminal 35 of starter 10 and thus may be termed a high speed relay. This relay may be exactly the same as the relay 31 and includes a pull in coil 41 and switch arms 42 and 43 cooperating with contacts 44 and 45.

The relays 31 and 32 are controlled by means of a step controller generally indicated as 46, a low pressure suction pressure controller 47, an intermediate pressure suction pressure controller 48, and a high pressure suction pressure controller 49. Referring to the step controller 46 this controller may include a proportioning motor 47' having an operating shaft 48' carrying cams 49', 50, and 51, these cams actuating cam followers 52, 53, and 54 which carry mercury switches 55, 56, and 57, respectively. The cams 49', 50, and 51 are adjusted on the shaft 48' so that when this shaft assumes its counter-clockwise limit of rotation, the mercury switches 55, 56, and 57 are all open as shown. As the shaft 48' begins rotation clockwise, the cam 49' will first tilt the mercury switch 55 to closed position while the mercury switches 56 and 57 will remain open. Upon continued rotation of the shaft 48' the cams 50 and 51 will cause tilting of the mercury switches 56 and 57 to closed position. The proportioning motor 47' may be of the type shown in the Taylor Patent 2,028,110 this motor being controlled by means of a return air thermostat 58 having a control bulb 59 located in the return air duct 2. This thermostat 58 is in turn compensated or adjusted by means of an outdoor thermostat 60 having a control bulb 61 located in the fresh air duct 3. The thermostat 58 controls the motor 47' so as to vary the angular position of the shaft 48' in accordance with the temperature in the zone being controlled. Thus when the temperature in the zone is below the setting of thermostat 58, the motor 47' will cause the shaft 48' to be rotated to the position shown in which the mercury switches 55, 56, and 57 are open. As the temperature in the zone increases to within the differential or operating range of the thermostat, the shaft 48' will be graduatingly rotated clockwise proportionately to the rise in temperature. The outdoor compensating thermostat 60 serves to determine the setting of the thermostat 58 in accordance with outside temperature for causing the inside temperature to rise upon rise in outside temperature.

The low pressure suction pressure controller 47 may be of any desired type and is illustrated as including a bellows 62 which is connected by a tube 63 with the suction line 20. This bellows actuates a mercury switch carrier 64 carrying a mercury switch 65, this bellows also being biased by an adjustable spring 66. This instrument may be adjusted so that the mercury switch 65 opens when the suction pressure falls to 25 lbs. and closes when the suction pressure rises to 30 lbs. The intermediate pressure suction pressure controller 48 may be exactly the same in construction as the controller 47 and includes a bellows 67 which actuates a mercury switch 68. This instrument may be adjusted so that the mercury switch 68 closes when the suction pressure rises to 35 lbs. per sq. inch and opens when this pressure falls to 30 lbs. per sq. inch. The high pressure suction pressure controller 49 may be of similar construction including a bellows 69 actuating a mercury switch 70. This instrument may be adjusted so that the mercury switch 70 closes when the suction pressure rises to 40 lbs. and opens when this pressure falls to 35 lbs.

The low and high speed relays 31 and 32 are additionally controlled by means of a timing device 71. This device is diagrammatically illustrated as including a motor 72 which operates at constant speed and drives an operating shaft 73. This operating shaft carries cams 74, 75, 76, and 77 which actuate mercury switches 78, 79, 80, and 81. These cams are arranged in staggered relationship on the shaft 73 so that only one mercury switch is closed at a time. The purpose of this timing device will become apparent as this description proceeds.

The compressor motor 9 and the solenoid valve 14 are additionally controlled by means of a humidity controller 82 which may be located in the return air duct 2. This humidity controller is diagrammatically illustrated as including a lever arm 83 which carries a mercury switch 84, this lever arm 83 being actuated by means of a humidity responsive device 85 and a biasing spring 86. When the relative humidity is low, the strands of the device 85 will be contracted thus causing the lever 83 to tilt the mercury switch 84 to the right, as shown. Upon increasing humidity the strands of device 85 will elongate thus gradually tilting mercury switch 84 to the left. This will first cause the globule of mercury in the switch to bridge electrodes 87 and 88. Upon continued increase in humidity the mercury switch 84 will be tilted further to the left for causing the mercury to bridge the electrodes 87, 88, and 89.

Reference character 1a indicates an air conditioning chamber for conditioning the air in a second zone. This chamber may be exactly the same as the chamber 1, being provided with a return air duct 2a, a fresh air duct 3a, a fan 4a, and a discharge duct 5a. This chamber is also provided with cooling coils 6a and 7a forming a part of a refrigeration system including a compressor 8a, a condenser-receiver 12a, a liquid line 13a, solenoid valves 14a and 15a, and expansion valves 16a and 17a. This refrigeration system may be exactly the same as that for zone 1, as shown. The controls for this system are also the same as for zone 1 and include a step controller 46a which is controlled by a return air thermostat 58a and an outdoor thermostat 60a. This step controller and the humidity controller 82a control the valves 14a and 15a, the starter 24a for the condenser water pump motor 23a, and the compressor motor starter 10a through relays 31a, and 32a, and suction pressure controllers 47a, 48a, and 49a. These control devices and the wiring therebetween may be exactly the same as that shown for zone 1 and accordingly these controls are not further described.

Operation

With the parts in the positions shown, the space temperature is below the setting of the return air thermostat 58 which has caused the shaft 48' of the step controller to rotate to its counter-clockwise limit of rotation wherein the mercury switches 55, 56, and 57 are open. Also the relative humidity is at a low value as indicated by the mercury switch 84 of the humidity controller 82 being tilted clockwise. For these conditions the starter for the condenser water pump 21 is deenergized and also the compressor controlling relays 31 and 32 are deenergized. The pump 21 and the compressor 9 are therefore out of operation at this time.

As the return air temperature in zone 1 begins rising within the control range of the return air thermostat 58, the shaft 48' of the step controller 46 will begin rotating clockwise thus causing the mercury switch 55 to be tilted to closed position. The mercury switches 56 and 57 will remain open. Tilting of mercury switch 55 to closed position will establish a circuit from line wire 90 through mercury switch 55, wire 91, solenoid valve 14 and wire 92 to line wire 93. This will cause the solenoid valve 14 to open for permitting flow of liquid refrigerant into the cooling coil 6. Closing of mercury switch 55 will also establish a circuit from line wire 90 through switch 55, wire 94, mercury switch 68 of the intermediate suction pressure controller 48, wire 95, wire 96, coil 30 of starter 24 and wire 97 to line wire 93. This will cause energization of the starter 24 for placing the condenser water pump 21 into operation. The engagement of switch arm 27 with contact 28 of starter 24 will complete a starting circuit for the low speed relay 31 as follows: line wire 90, mercury switch 55, wire 94, mercury switch 68, wires 95, 96, and 98, contact 28, switch arm 27, wire 99, mercury switch 65 of low pressure suction pressure controller 47, wire 100, mercury switch 78, wire 101, pull in coil 40, wires 102, 103, and 97 to line wire 93. Energization of pull in coil 40 will cause the switch arms 36 and 37 to engage contacts 38 and 39. Engagement of switch arm 36 with contact 38 will complete a circuit through terminals 33 and 34 of the starting box 10 as follows: line wire 90, mercury switch 55, wire 94, mercury switch 68, wires 95, 96, and 98, switch arm 27, wire 99, mercury switch 65, wire 100, wire 104, switch arm 36, contact 38, wire 105, low speed terminal 34 of starting box 10, common terminal 33 and wires 106, 103, and 97 to line wire 93. Therefore the compressor motor 9 will be caused to operate at low speed. Engagement of the switch arm 37 with contact 39 will complete a circuit from the mercury switch 65 through wires 100 and 104 to coil 40 which is independent of the circuit through the mercury switch 78 of the timer 71. Consequently when this mercury switch 78 opens due to the action of the timer, the relay coil 40 will remain energized.

From the description of operation thus far it will be apparent that when the mercury switch 55 closes, the solenoid valve 14 is opened and the starter 24 for the condenser water pump 23 is energized for placing this pump in operation. It should also be apparent that when this starter is energized it completes a starting circuit for the low speed relay 31, through the mercury switch 78 of the timer 71. When the low speed relay pulls in, it closes a power circuit through terminals 33 and 34 of the starting box 10 for operating the compressor at low speed and also shunts out the mercury switch 78 of the timer 71 so that this switch may open without deenergizing this relay. It will be noted that in this stage of operation, the mercury switch 68 of the intermediate pressure suction pressure controller 48 is in circuit with the coil 30 of starter 24. Consequently when operation of the compressor reduces the suction pressure below 30 lbs. the resulting opening of the mercury switch 68 will deenergize the coil 30 which deenergizes the pump motor 23 and also breaks the energizing circuits for the low speed relay 31 and the starting box 10. Therefore the compressor 8 will be placed out of operation and will remain out of operation until the suction pressure rises to 35 lbs. and the switch 78 in the starting circuit for relay 40 are again closed.

Assuming that the compressor is in operation at low speed with only the solenoid valve 14 open and that the suction pressure increases to 40 lbs., the mercury switch 70 of the high pressure suction pressure controller 49 will close. When the mercury switch 79 of the timer is closed a starting circuit for the high speed relay 32 will be established as follows: from line wire 90, mercury switch 55, wire 94, mercury switch 68, wires 95, 96 and 98, switch arm 27, wire 99, mercury switch 65, wire 100, wire 104, switch arm 36, contact 38, wire 105, wire 108, mercury switch 70, wire 109, wire 110, mercury switch 79, wire 111, relay coil 41, and wires 112, 102, 103, and 97 to line wire 93. Energization of coil 41 will cause the switch arms 42 and 43 to engage contacts 44 and 45. Engagement of contact 43 with the contact 45 will establish a maintaining circuit for coil 41 which is independent of the mercury switch 79 of timer 71. This maintaining circuit is as follows: mercury switch 70, wire 109, wire 113, switch arm 43, and contact 45 to coil 41. Therefore when the switch 79 of the timer 71 opens the coil 41 will remain energized. The engagement of switch arm 42 with contact 44 will estabish a circuit from the now energized wire 113 through wire 114 to the high speed terminal 35 of the starter 10 thus causing the compressor 9 to operate at high speed. This operation will continue until the suction pressure is pumped down to 35 lbs. at which time the mercury switch 70 of controller 49 opens for deenergizing the relay 41 thus returning the compressor to operation at low speed.

Upon continued rise in space temperature the shaft 48' of step controller 46 will rotate for causing closure of mercury switch 56. Closure of mercury switch 56 will energize the solenoid valve 15 of the second cooling coil 7 as follows: line wire 90, mercury switch 55, wire 91, wire 115, mercury switch 56, wire 116, solenoid valve 15 and wires 117 and 92 to line wire 93. This will permit refrigerant to flow into the cooling coil 7 thereby increasing the amount of cooling performed.

Upon further rise in temperature the mercury switch 57 will be closed and this will complete an energizing circuit for the coil 30 of starter 24 which is independent of the intermediate pressure suction pressure controller 48 as follows: line wire 90, mercury switch 55, wire 115, mercury switch 57, wire 118, wire 119 and wire 96 to coil 30. This circuit, it will be noted, shunts out the mercury switch 68 of controller 48 and consequently the starter 24 will remain energized even when the suction pressure is pumped to a point below the setting of controller 48.

The mercury switch 65 of the low pressure suction pressure controller 47 is in both the starting and maintaining circuit for the relay coil 40 and therefore as long as the starter coil 30 is energized and this mercury switch is closed, the compressor will remain in operation in at least low speed. If the suction pressure rises to 40 lbs. the mercury switch 70 of the high pressure controller 49 will close thereby energizing the high speed relay 32 for causing operation of the compressor at high speed in the manner previously pointed out in detail. The compressor will then run at high speed until the suction pressure is reduced to 35 lbs. at which time the mercury switch 70 opens for deenergizing relay 32 and returning the compressor to low speed operation. If the suction pressure is reduced to 25 lbs. the mercury switch 65 of controller 47 will open which will deenergize the relay 31 for placing the compressor out of operation.

While in some cases it is desirable to actuate the mercury switches 56 and 57 in sequence so that cooling coil 7 is first placed into operation and then the compressor controls are varied upon rise in space temperature as described above, the switches 56 and 57 may be actuated simultaneously if so desired. In some installations this simultaneous action may be preferable.

The above described sequence of operation for the system has been made on the assumption that the relative humidity is below the setting of the humidity controller 82. If the relative humidity should rise to an intermediate value for causing bridging of the electrodes 87 and 88 of mercury switch 84 and assuming that the step controller is calling for operation of the compressor by closing mercury switch 55, a circuit will be completed from line wire 90 to the starter coil 30 as follows: wire 90, mercury switch 55, wire 91, wire 120, electrode 87, electrode 88, wire 121, wire 119 and wire 96 to coil 30. This circuit it will be noted is independent of the mercury switch 68 of the intermediate pressure controller 48. Consequently this controller will be placed out of operation thereby permitting the suction pressure to be reduced to a lower value. This independent circuit to coil 30 through the mercury switch 84 is also through the mercury switch 55 as traced. Consequently if the temperature in the zone is below the setting of thermostat 58 which causes opening of the mercury switch 55, no action will occur when the electrodes 87 and 88 of mercury switch 84 are bridged. However, if the relative humidity rises to a still higher value, the electrodes 88 and 89 of switch 84 will become bridged. This will complete a circuit directly from the line wire 90 through wire 122 to electrode 89 and through electrode 88 and wires 121, 119 and 96 to the coil 30 thus causing the starter 24 to be energized independently of the mercury switch 55. This circuit it will be noted is independent of the intermediate pressure controller 48 which permits the pump to operate and the compressor to operate at low speed even though the suction pressure falls below the setting of pressure controller 48. At this same time a circuit will be completed through electrodes 89 and 87 of the mercury switch 84 for energizing the solenoid valve 14. This circuit is as follows: line wire 90, wire 122, electrode 89, electrode 87, wire 120, wire 91, solenoid valve 14 and wire 92 to line wire 93. Therefore when the relative humidity rises to a high value the compressor will be placed into operation at low speed under the control of the low pressure controller 47 and the solenoid valve 14 will be opened. This operation of the compressor under the control of the low pressure controller 47 will permit the temperature of the cooling coil 6 to be lowered to a low value which increases the dehumidifying effect of coil 6.

From the foregoing it will be apparent that when the relative humidity controller is satisfied, the operation of the compressor and valves 14 and 15 is determined by the step controller 46. If there is no demand for cooling, this step controller will place the compressor and the circulating pump out of operation. Upon a medium demand for cooling this step controller will open the solenoid valve 14 for permitting refrigerant to enter coil 6 and will also cause operation of the compressor through the intermediate pressure controller 48. Thus if the operation of the compressor reduces the suction pressure to the setting of the controller 48 the compressor and pump will be stopped. It will also be apparent that upon demand for increased cooling by the thermostat 58, the step controller 46 will open the solenoid valve 15 for placing the second cooling coil in operation and at the same time or upon further demand for cooling will also permit the compressor to operate for reducing the suction pressure or coil temperature to a lower value for providing an increased amount of cooling. If due to heavy load conditions the suction pressure rises to a predetermined high value, the controller 49 will operate the compressor at high speed and this action will occur irrespective of whether both coils or only a single coil are in operation. It should also be apparent that if the relative humidity rises to an intermediate value and the compressor is running under the control of the step controller 46, the humidity controller will permit the compressor to operate until the suction pressure is reduced to the low value for causing the dehumidifying effect of the cooling coil 6 to reach a maximum. If the compressor is not running at the time that the relative humidity assumes an intermediate value no action will occur. However, if the relative humidity rises to a higher value the cooling coil 6 and the compressor will be placed into operation under the control of the low pressure controller for permitting a maximum amount of dehumidification to be performed.

It should also be apparent from the foregoing description that the timer 71 by only permitting one starting circuit for relays 31, 31a, 32 and 32a to be completed at a time, permits only one of these relays to be energized at a time. This prevents the compressor motors 9 and 9a from being started simultaneously or increased in speed simultaneously or one starting while the other is increasing in speed. This arrangement thus avoids any possible overloading of the power supply lines to the compressor motors.

*Figure 2*

In Figure 1 it will be noted that only the low speed operation of the compressor is affected by the temperature controlled step controller or by the humidity controller. In some installations it is desirable to vary both the low speed control and the high speed control of the compressor by the step controller 46 and the humidity controller 82. Referring to Figure 2 this figure shows an arrangement of the latter type. In this figure the air conditioning system and controls are exactly the same as for zone 1 of Figure 1 excepting that the intermediate suction pressure controller is provided with an additional mercury switch 200 and the mercury switch of the humidity controller 82 is provided with extra electrodes 201 and 201a. Inasmuch as the system and control devices of Figure 2 are the same as for Figure 1, the corresponding parts are provided with like reference numerals and the system is not described at this point. The wiring in Figure 2 is somewhat different from that in Figure 1 and will be described in the following statement of operation.

*Operation of Figure 2*

Assuming that the relative humidity controller 82 is satisfied but that the space temperature has risen to a point wherein only the mercury switch 55 of step controller 46 is closed, the solenoid valve 14 will be energized as follows: line wire 90, mercury switch 55, wire 91, solenoid valve 14 and wire 92 to line wire 93. Also the starter 24 for pump motor 23 will be energized as follows: line wire 90, mercury switch 55, wire 202, wire 203, coil 30, and wire 204 to line wire 93. The circulating pump 21 will therefore be placed in operation and the switch arm 27 will engage the contact 28. Closing of mercury switch 55 will also complete a starting circuit for the relay coil 40 of the low speed relay 31 through mercury switch 78 of timer 71 as follows: line wire 90, mercury switch 55, wire 202, wire 205, mercury switch 68 of controller 48, wire 206, mercury switch 78, wire 207, relay coil 40, wire 208, switch arm 27, wire 209, and wire 204 to line wire 93. Energization of coil 40 of relay 31 will cause the switch arms 36 and 37 to engage contacts 38 and 39. Engagement of contact 37 with contact 39 will complete a maintaining circuit for coil 40 which is independent of mercury switch 78 as follows: mercury switch 68, wire 210, switch arm 37, and contact 39 to relay coil 40. The coil 40 will therefore remain energized even after the mercury switch 78 of timer 71 opens. Engagement of switch arm 36 with contact 38 will complete a circuit from the mercury switch 68 through terminals 34 and 33 of the starter 10 back to line wire 93 as follows: mercury switch 68, wire 210, switch arm 36, wire 211, low speed terminal 34, common terminal 33, wire 212, wire 208, switch arm 27 and wires 209 and 204 to line wire 93. The compressor motor 9 will therefore be operated at low speed. Due to the mercury switch 68 of controller 48 being in the circuit to relay coil 40 and the starter 10, the relay 31 and the starter 10 will be deenergized whenever the suction pressure falls below 30 lbs. If the suction pressure rises to 40 lbs. the mercury switch 70 of controller 49 will close. This will energize the high speed relay 32 as follows: line wire 90, mercury switch 55, wire 202, wire 205, wire 213, mercury switch 70, wire 214, wire 215, wire 216, mercury switch 79, wire 217, coil 41, wire 218, wire 208, switch arm 27, wire 209, and wire 204 to line wire 93. Energization of coil 41 will cause switch arms 42 and 43 to engage contacts 44 and 45. Engagement of contact 43 with contact 45 will establish a circuit from mercury switch 70 to coil 41 which is independent of the mercury switch 79 of timer 71, this circuit being as follows: mercury switch 70, wire 214, wire 219, switch arm 43 and contact 45 to coil 41. Engagement of switch arm 42 with contact 44 will complete a circuit from mercury switch 70 to the high speed contact 35 of starter 10 as follows: mercury switch 70, wire 214, wire 219, switch arm 42, contact 44, and wire 220 to contact 35.

This will cause operation of the compressor at high speed. This action will occur until the suction pressure is again reduced to 35 lbs. at which time mercury switch 70 opens thus deenergizing relay 41 and returning the compressor to low speed operation.

From the description of Figure 2 thus far it should be apparent that when the relative humidity controller is satisfied and only the mercury switch 55 of step controller 46 is closed, the compressor is controlled by controllers 48 and 49. At this time the intermediate pressure controller 48 will cause operation of the compressor at low speed when the suction pressure reaches an intermediate value, and the high pressure controller 49 will cause operation of the compressor at high speed when the suction pressure rises to a higher value.

Upon rise in space temperature to a higher value the shaft 48' of step controller 46 will rotate for causing closure of mercury switches 56 and 57. These switches may close either simultaneously or the switch 56 may close prior to closure of switch 67. Closure of mercury switch 56 will complete a circuit from line wire 90 through the solenoid valve 15 as follows: line wire 90, mercury switch 55, wire 115, mercury switch 56, wire 116, solenoid valve 15, and wires 117 and 92 to line wire 93. This will place the cooling coil 7 into operation thus increasing the active cooling surface. Closure of mercury switch 57 will cause operation of the compressor at high speed through the intermediate suction pressure controller 48. This circuit is as follows: line wire 90, mercury switch 55, wire 115, mercury switch 57, wire 222, mercury switch 200, wire 223, wire 216, timer mercury switch 79 and wire 217 to relay coil 41. The resulting energization of relay coil 41 will cause operation of the compressor at high speed and establish a maintaining circuit for coil 41 which is independent of the timer switch 79. It will thus be apparent that when the step controller 46 closes mercury switch 57 it renders the intermediate suction pressure controller 48 capable of causing operation of the compressor at high speed instead of at low speed as occurs when only the switch 55 is closed.

At this time if the operation of the compressor at high speed reduces the suction pressure below 30 lbs. the mercury switches 200 and 68 of the controller 48 will open. This opening of the mercury switch 200 will break the energizing circuit for relay coil 41 thus dropping out this relay. However, at this time the mercury switch 64 of the low pressure controller 47 will be closed which will maintain the low speed relay 40 energized as follows: line wire 90, mercury switch 55, wire 115, mercury switch 57, wire 225, mercury switch 64, wire 226, wire 210, switch arm 37 and contact 39 to relay coil 40. Consequently the compressor will operate at low speed until the suction pressure is reduced to 25 lbs. at which value the mercury switch 64 opens for stopping the compressor. When the suction pressure rises to 30 lbs. this switch 64 will close which will first complete a starting circuit for relay coil 40 as follows: mercury switch 64, wire 226, wire 206, mercury switch 78 and wire 207 to coil 40. When the relay pulls in for causing operation of the compressor at low speed, the resulting engagement of switch arm 37 with contact 39 will reestablish the maintaining circuit for coil 40 as previously traced.

From the description thus far it will be apparent that when the step controller 46 causes opening of the solenoid valve 15 it then or after a further increase in cooling load transfers the control of the low speed relay 31 and the high speed relay 32 from the intermediate pressure controller 48 and the high pressure controller 49 to the low pressure controller 47 and the intermediate pressure controller 48. The simultaneous change in the compressor controls with the opening of valve 15 has the advantage of increasing the compressor speed immediately for handling the increased load caused by operation of cooling coil 7. This also permits the temperature of coils 6 and 7 to be lowered for still further increasing the cooling effect for thereby carrying the increased cooling load on the system.

Assume again that the step controller 56 has only the mercury switch 55 closed which opens solenoid valve 14 and places the compressor under the control of controllers 48 and 49. If now the relative humidity rises to an intermediate value, the mercury switch 84 will tilt for bridging electrodes 87, 201 and 88. This will complete a first circuit from line wire 90 through mercury switch 55, wire 91, wire 228, electrode 87, electrode 201, wire 229 and wire 225 to mercury switch 64. Also a parallel circuit will be completed from electrode 87 through electrode 88, wire 230 and wire 222 to the mercury switch 200. This bridging of electrodes 87, 201 and 88 of mercury switch 84 thus has exactly the same effect as closure of mercury switch 57 of the step controller 46. In other words, this action renders the mercury switch 64 of the low pressure controller 47 capable of operating the compressor at low speed and renders the mercury switch 200 of the intermediate pressure controller 48 capable of causing operation of the compressor at high speed. The effect of this closure of mercury switch 84 of the humidity controller therefore is to cause the suction pressure to be reduced which causes the temperature of coil 6 to lower for increasing the amount of dehumidification performed.

It should be noted that the circuits through the mercury switch 87 to the mercury switches 64 and 200 under intermediate humidity conditions are through the mercury switch 55 of the step controller 46. Consequently if this switch is not closed, the mercury switch 84 of the humidity controller 82 assuming its intermediate position will have no effect. However, if the relative humidity rises to a high value the mercury switch 84 will be tilted still further for causing bridging of all electrodes 89, 88, 87 and 201. This will complete a circuit directly from the line wire 90 through wire 231 to the mercury switches 64 and 200 of the controllers 47 and 48 thus permitting these controllers to cause operation of the compressor at either low or high speed or to stop the compressor depending upon the value of suction pressure. This position of the mercury switch 84 will also establish an energizing circuit for the pump motor starter 24 as follows: line wire 90, wire 231, electrode 89, electrode 201a, wire 232, wire 202, wire 203, coil 30, and wire 204 to line wire 93. Thus the pump motor will be operated and the switch arm 27 of the starter 24 will engage the contact 28 for thereby connecting the relay coils 40 and 41 and the common terminal 33 of starter 10 to the line wire 93. Due to the switch arm 27 being in circuit with the coils 40 and 41 and the compressor starter 10 the compressor cannot operate unless the relay 24 is energized. This prevents any possibility of the compressor operation when the circulating pump 21 is at rest. At this time, an independent circuit for solenoid valve 14 is established by the mercury switch 84 as follows: line wire 90, wire 231, electrode 89, electrode 87, wire 228, solenoid valve 14 and wire 92 to line wire 93.

From the description of Figure 2 it will be apparent that in this figure when the humidity controller is satisfied the control of the compressor and solenoid valves is entirely with the temperature controlled step controller 46. It will also be apparent that when this step controller indicates a light call for cooling, only the valve 14 is opened for placing coil 6 in operation and the compressor is controlled by the intermediate pressure and high pressure suction pressure controllers. However, when the step controller indicates an increased call for cooling, the second cooling coil is placed into operation by opening the valve 15 and at the same time or upon further demand for cooling the control of the two speed compressor is shifted from the intermediate and high pressure controllers to the low and intermediate pressure controllers thereby increasing the speed of the compressor for accommodating the increased load and also for lowering the cooling coil temperature so as to provide an increased amount of cooling. It will also be apparent that when the humidity controller indicates that the humidity is at a high value the control of the compressor is placed with the low and intermediate pressure controllers irrespective of the number of cooling coils in operation and the compressor is placed into operation even if it had not been previously operating. However when the humidity controller indicates only an intermediate value of humidity no action will occur unless the compressor is in operation under the command of the step controller. If this is the case the humidity controller will cause the compressor to be controlled by the low and intermediate pressure controllers irrespective of the number of cooling coils in operation.

While I have shown and described two preferred forms of my invention it will be understood that the invention is not limited to the specific disclosures and is applicable not only to direct expansion cooling systems but also to indirect systems in which a heat exchange medium is passed in heat exchange relationship with the air being conditioned. While in some cases it is preferable to utilize separate suction pressure controllers it will be apparent that if desired a single controller may be used, this controller being adjusted to maintain different values of suction pressure by means of the various control devices. Also while it is preferable to utilize suction pressure responsive controllers, similar results can be obtained by utilizing a thermostat or thermostats which are influenced by the temperature of the cooling devices. It will be understood that while for illustrative purposes definite values of pressure have been mentioned at which the controllers operate these values are illustrative only and will vary for different refrigerants and different installations and applications of the invention. As various modifications may be made which are within the scope of the invention it is desired to be limited only by the scope of the appended claims.

I claim as my invention:

1. In an air conditioning system for a space, in combination, heat exchange means for conditioning the air, means for supplying cooling fluid to said heat exchange means, heat exchange control means for varying the transfer of heat from the air to said heat exchange means, temperature control means including means influenced by the temperature of the cooling fluid in the heat exchange means for controlling the temperature of the heat exchange means, and means responsive to the demand for heat removal in said space for actuating said heat exchange control means while the system is operating to thereby vary said transfer of heat and for adjusting said temperature control means to vary the setting thereof substantially simultaneously with actuation of said heat exchange control means.

2. In an air conditioning system for a space, in combination, heat exchange means for conditioning the air, means for supplying cooling fluid to said heat exchange means, heat exchange control means for varying the transfer of heat from the air to said heat exchange means, temperature control means including means influenced by the temperature of the cooling fluid in the heat exchange means for controlling the temperature of the heat exchange means, and means responsive to the demand for heat removal in the space for actuating said heat exchange control means and for substantially simultaneously adjusting said temperature control means while the system is operating, said responsive means being constructed and arranged to cause increase in the transfer of heat by actuating said heat exchange control means and to adjust said temperature control means in a manner to reduce the temperature of the cooling fluid in said heat exchange means upon increase in demand for heat removal.

3. In an air conditioning system for a space, in combination, a first heat exchanger for conditioning the air, a second heat exchanger for conditioning the air, means for supplying cooling fluid to said heat exchangers, valve control means for placing said second heat exchanger into and out of operation, temperature control means including means influenced by the temperature of the cooling fluid in the heat exchangers for controlling the temperature of the heat exchangers, and means responsive to a condition varying with the demand for heat removal in said space for actuating said valve control means to vary the flow of cooling medium and for simultaneously adjusting the temperature control means in a manner to lower the heat exchanger temperature when said condition varies in a direction indicating increase in demand for heat removal.

4. In an air conditioning system for a space, in combination, a first heat exchanger for conditioning the air, a second heat exchanger for conditioning the air, means for supplying cooling fluid to said heat exchangers, valve control means for placing said second heat exchanger into and out of operation, temperature control means including means influenced by the temperature of the cooling fluid in the heat exchangers for controlling the temperature of the heat exchangers, and means responsive to a condition varying with the demand for heat removal in said space for actuating said valve control means and for simultaneously adjusting the temperature control means, said responsive means being constructed and arranged to place said second heat exchanger into operation and to adjust said temperature control means for reducing the temperature of the cooling medium when the condition varies in a direction indicating increase in demand for heat removal.

5. In an air conditioning system for a space, in combination, direct expansion cooling coil means over which air is passed, said cooling coil means forming part of a refrigeration system including a compressor, first control means for varying the heat transfer between said cooling coil means and the air, second control means for controlling said compressor in a manner tending to maintain the refrigerant in the evaporator at a predetermined temperature, and means responsive to the demand for heat removal in said space for actuating said first control means while the system is operating to thereby vary the transfer of heat and for adjusting said second control means to vary the setting thereof substantially simultaneously with actuation of said first control means.

6. In an air conditioning system for a space, in combination, direct expansion cooling coil means over which air is passed, said cooling coil means forming part of a refrigeration system including a variable capacity compressing means, first control means for varying the flow of refrigerant into said cooling coil means, second control means including means influenced by the temperature of the refrigerant in the cooling coil means for controlling said compressing means and acting to increase the capacity of the compressing means upon increase in said temperature, and means responsive to the demand for heat removal for actuating the first control means to vary the flow of refrigerant and for simultaneously adjusting the second control means to vary the temperature of the refrigerant upon variation in said demand.

7. In an air conditioning system for a space in combination, a first direct expansion cooling coil over which air is passed, a second direct expansion cooling coil over which air is passed, said cooling coils forming a part of a refrigeration system including variable capacity compressing means, valve control means for individually controlling the flow of refrigerant through said cooling coils, temperature responsive means responsive to temperature at a point which is a measure of the cooling load on the system for sequentially actuating said valve control means to sequentially place said cooling coils into operation as the cooling load increases, compressor control means including means influenced by the temperature of the refrigerant in the cooling coils for varying the capacity of the compressing means in accordance with the load on the cooling coils, and means controlled by said temperature responsive means for adjusting said compressor control means in a manner to vary the temperature of the refrigerant in accordance with the number of coils in operation.

8. In an air conditioning system for a space, in combination, heat exchange means for conditioning the air, means for supplying cooling fluid to said heat exchange means, flow control means for controlling the flow of cooling fluid to said heat exchange means, temperature control means including means influenced by the temperature of the cooling fluid in the heat exchange means for controlling the temperature of the heat exchange means, means influenced by the demand for sensible heat removal for actuating said flow control means and for adjusting said temperature control means in a manner to increase the flow of cooling fluid and to lower its temperature upon increase in said demand, and means influenced by the dehumidifying load for adjusting said temperature control means in a manner to lower the temperature of the heat exchange means upon increase in said dehumidifying load.

9. In an air conditioning system for a space, in combination, a first heat exchanger for conditioning the air, a second heat exchanger for conditioning the air, means for supplying cooling fluid to said heat exchangers, valve control means for placing said second heat exchanger into and out of operation, temperature control means including means influenced by the temperature of the cooling fluid in the heat exchangers for controlling the temperature of the heat exchangers, means influenced by the demand for sensible heat removal for actuating said valve control means and for adjusting said temperature control means in a manner to increase the flow of cooling fluid and to lower its temperature upon increase in said demand, and means influenced by the dehumidifying load for adjusting said temperature control means in a manner to lower the temperature of at least one heat exchanger when the dehumidifying load increases.

10. In an air conditioning system for a space, in combination, direct expansion cooling coil means over which air is passed, said cooling coil means forming part of a refrigeration system including a variable capacity compressing means, first control means for varying the flow of refrigerant into said cooling coil means, second control means including means influenced by the temperature of the refrigerant in the cooling coil means for controlling said compressing means and acting to increase the capacity of the compressing means upon increase in said temperature, means influenced by demand for sensible heat removal for actuating said first control means to vary the flow of refrigerant into the cooling coil and for substantially simultaneously adjusting said second control means to vary the temperature of the refrigerant, and means influenced by the dehumidifying load on the system for adjusting said second control means in a manner to lower the temperature of the refrigerant upon rise in the dehumidifying load.

11. In an air conditioning system for a space, in combination, direct expansion cooling means over which air is passed, said cooling means forming part of a refrigeration system including variable capacity compressing means, valve control means for varying the flow of refrigerant into said cooling means, means influenced by the demand for heat removal in said space for controlling said valve control means in a manner to increase the flow of refrigerant upon increase in said demand, compressor control means influenced by the temperature of the refrigerant flowing through said cooling means for increasing the capacity of the compressing means upon increase in temperature of said refrigerant, and means actuated with said valve control means for adjusting the control point of said compressor control means in a manner to increase the capacity of said compressing means when said valve control means is actuated for increasing the flow of refrigerant.

12. In an air conditioning system, in combination, direct expansion cooling means over which air is passed, said cooling means forming part of a refrigeration system including a variable capacity compressing means, valve control means for varying the flow of refrigerant into said cooling means, a first control relay adapted when energized to cause operation of said compressing means at low capacity, a second control relay adapted when energized to cause operation of said compressing means at high capacity, each of said relays including a starting circuit and a holding circuit, temperature control means influenced by the temperature of the refrigerant flowing through said cooling means for controlling both the starting and holding circuits for said first control relay and said second control relay in a manner to energize said first control relay and said second control relay in sequence upon rise in said temperature, and means responsive to the demand for heat removal for controlling said valve control means to vary the flow of refrigerant and for adjusting said temperature control means to vary the temperature of the refrigerant in accordance with the demand for heat removal.

13. In an air conditioning system, in combination, cooling means for cooling air, said cooling means including variable capacity compressing means, a first control relay adapted when energized to cause operation of said compressing means at low capacity, a second control relay adapted when energized to cause operation of said compressing means at high capacity, each of said relays including a starting circuit and a holding circuit, means responsive to a demand for heat removal for controlling both the starting and holding circuits of said relays in a manner to sequentially energize said relays upon increase in demand for heat removal and vice versa, and means associated with said relays for alternately opening the starting circuits of said relays for thereby preventing both of said relays from being initially energized at the same time.

14. In an air conditioning system, in combination, cooling means for cooling air, said cooling means including compressing means, a first control relay for said compressing means, a second control relay for said compressing means, each of said relays having a starting circuit and a holding circuit, means responsive to the demand for heat removal for controlling both the starting and holding circuits for said relays, and means associated with said relays for alternately opening the starting circuits of said relays for thereby preventing both of said relays from being initially energized at the same time.

15. In an air conditioning system, in combination, cooling means for cooling air, said cooling means including compressor means comprising a first compressor and a second compressor, a first relay adapted when energized to energize said first compressor, a second relay adapted when energized to energize said second compressor, each of said relays having a starting circuit and a holding circuit, means responsive to a demand for heat removal for controlling both the starting and holding circuits for said relays, and means associated with said relays for alternately opening the starting circuits of said relays for thereby preventing both of said relays from being initially energized at the same time.

16. In an air conditioning system, in combination, cooling means for cooling air, said cooling means including a first variable capacity compressing means and a second variable capacity compressing means, a first relay for said first compressing means for causing operation of said first compressing means at low capacity, a second relay for said first compressing means for causing operation thereof at high capacity, a first relay for said second compressing means for causing operation of said second compressing means at low capacity, a second relay for said second compressing means for causing operation thereof at high capacity, each of said relays having a starting circuit and a holding circuit, a first means responsive to demands for heat removal for controlling the starting and holding circuits for the relays for said first compressing means, a second means responsive to demands for heat removal for controlling the relays for said second compressing means, and means associated with said relays for intermittently and alternately rendering said starting circuits operative and inoperative.

17. In an air conditioning system for a space in combination, a first direct expansion cooling coil over which air is passed, a second direct expansion cooling coil over which air is passed, said cooling coils forming a part of a refrigeration system including variable capacity compressing means, valve control means for individually controlling the flow of refrigerant through said cooling coils, temperature responsive means responsive to space temperature for sequentially actuating said valve control means to sequentially place said cooling coils into operation as the said temperature increases, compressor control means including means influenced by the temperature of the refrigerant in the cooling coils for varying the capacity of the compressing means in accordance with the load on the cooling coils, and means controlled by said temperature responsive means for adjusting said compressor control means in a manner to lower the temperature of the refrigerant upon increase in the temperature.

18. In an air conditioning system for a space, in combination, direct expansion cooling coil means over which air is passed, said cooling coil means forming part of a refrigeration system including a variable capacity compressing means, first control means for varying the flow of refrigerant into said cooling coil means, second control means including means influenced by the temperature of the refrigerant in the cooling coil means for controlling said compressing means and acting to increase the capacity of the compressing means upon increase in said temperature, means influenced by the demand for sensible heat removal for actuating said first control means and for substantially simultaneously adjusting said second control means in a manner to increase the flow of refrigerant into the cooling coil and to lower the temperature of the refrigerant upon increase in the demand for sensible cooling, and means influenced by the dehumidifying load on the system for adjusting said second control means in a manner to lower the temperature of the refrigerant upon rise in the dehumidifying load.

19. In an air conditioning system for a space, in combination, heat exchange means for conditioning the air, means for supplying cooling fluid to the heat exchange means, heat exchange control means for varying the transfer of heat from the air to said heat exchange means, temperature control means including means for varying the supply of cooling fluid for said heat exchange means and means influenced by the temperature of the cooling fluid in the heat exchange means for controlling said means for varying the supply of cooling fluid in a manner to increase the supply of cooling fluid upon increase in said cooling fluid temperature, means responsive to the demand for heat removal in said space for actuating said heat exchange control means and for simultaneously adjusting said temperature control means, said means responsive to a demand for heat removal acting upon an increase in demand for heat removal to actuate said heat exchange control means for increasing the transfer of heat between said air and said heat exchange means and to adjust said temperature control means for increasing the supply of cooling fluid for said heat exchange means.

20. In an air conditioning system, in combination, direct expansion cooling means over which air is passed, said cooling means forming part of a refrigeration system including a variable capacity compressing means, valve control means for varying the flow of refrigerant into said cooling means, a first control relay adapted when energized to cause operation of said compressing means at low capacity, a second control relay adapted when energized to cause operation of said compressing means at high capacity, each of said relays including a starting circuit and a holding circuit, temperature control means influenced by the temperature of the refrigerant flowing through said cooling means for controlling both the starting and holding circuits for said first control relay and said second control relay in a manner to energize said first control relay and said second control relay in sequence upon rise in said temperature, means responsive to the demand for heat removal for controlling said valve control means to vary the flow of refrigerant and for adjusting said temperature control means to vary the temperature of the refrigerant in accordance with the demand for heat removal, and means associated with said relays for alternately opening the starting circuits of said relays for thereby preventing both of said relays from being initially energized at the same time.

21. A medium conditioning system for a space in combination comprising, means including a plurality of cooling coils for contact with the medium to be conditioned, variable capacity means for supplying refrigerant to the said cooling coils, valve means for selectively controlling the supply of refrigerant to each of said plurality of cooling coils, means responsive to the suction pressure of said cooling coil means for controlling the variable capacity refrigerant supply means for said coils, said suction pressure means being influenced by the temperature of the refrigerant in the cooling coils and acting to increase the refrigerant supply upon increase in the said temperature, and means influenced by the demand for heat removal in said space for controlling the actuation of said valve refrigerant supply control means and for substantially simultaneously adjusting the suction pressure refrigerant capacity controlling means to selectively control both the number of coils to which the refrigerant is supplied and the pressure of the refrigerant maintained in the coils to thus vary the heat exchange action in acccordance with the said demand for heat removal.

HAROLD L. STEINFELD.